(12) United States Patent  
Klein et al.

(10) Patent No.: US 8,095,319 B2  
(45) Date of Patent: Jan. 10, 2012

(54) SYSTEM AND METHOD FOR FAULT IDENTIFICATION

(75) Inventors: Pascal Klein, Billere (FR); Gael Gouzien, Toulouse (FR)

(73) Assignee: Paradigm Geophysical Ltd., Herzliya (IL)

( * ) Notice: Subject to any disclaimer, the term of this patent is extended or adjusted under 35 U.S.C. 154(b) by 0 days.

(21) Appl. No.: 12/955,175

(22) Filed: Nov. 29, 2010

(65) Prior Publication Data

US 2011/0071763 A1   Mar. 24, 2011

Related U.S. Application Data

(63) Continuation of application No. 11/791,373, filed as application No. PCT/IL2005/001245 on Nov. 23, 2005, now Pat. No. 7,844,402.

(60) Provisional application No. 60/630,292, filed on Nov. 24, 2004.

(51) Int. Cl.  
*G01V 1/28*   (2006.01)

(52) U.S. Cl. ............................................. 702/14; 702/16
(58) Field of Classification Search ............. 702/14–17; 367/72, 73  
See application file for complete search history.

(56) References Cited

U.S. PATENT DOCUMENTS 5,987,388 A * 11/1999 Crawford et al. ................ 702/16  
2007/0078604 A1 * 4/2007 Kim et al. ........................ 702/16

* cited by examiner

*Primary Examiner* — Manuel L Barbee  
(74) *Attorney, Agent, or Firm* — Pearl Cohen Zedek Latzer, LLP

(57) ABSTRACT

A system, which may be and/or may include a computer system, and method for identifying a fault patch position from a seismic data volume. The system and method may include defining an initial active surface in the seismic data volume; identifying one or more active surfaces by minimizing the value of a function for energy; tracking back the active surfaces to find a set of control points; and producing the fault patch position formed by the set of control points.

20 Claims, 10 Drawing Sheets

SYSTEM AND METHOD FOR FAULT IDENTIFICATION

CROSS-REFERENCE TO RELATED APPLICATIONS

This application is a continuation of U.S. patent application Ser. No. 11/791,373, filed Nov. 8, 2007, now U.S. Pat. No. 7,844,402 issued on Nov. 30, 2010, which in turn is a national stage application of International Application PCT/IL2005/001245, filed on Nov. 23, 2005, which in turn claims priority from U.S. provisional application Ser. No. 60/630,292, filed on Nov. 24, 2004, all of which are incorporated by reference herein in their entirety.

FIELD OF THE INVENTION

The present invention relates generally to the field of three-dimensional seismic data processing and presentation. Specifically, it relates to a system and method for extracting or identifying fault location information from a seismic data set.

BACKGROUND OF THE INVENTION

The petroleum industry is allocating more and more resources to imaging subsoil rock structures in an effort to identify potential oil reserves underground. For example, large numbers of datasets of three-dimensional (3-D) seismic data volume are being generated through various exploration activities. The datasets are typically representations of changes in acoustic impedance of underground earth as a function of, for example, depth underneath the ground. Most seismic reflections in a 3-D seismic dataset are manifestations of rock layering or horizons. These manifestations represent the sub-horizontal sedimentary layering within petroleum-bearing sedimentary basins. A geologically trained professional may recognize the patterns presented by these 3-D datasets and therefore may be able to extract useful insight information into the rock formation and geological structure, as well as such things as the location and shape of geological structures in which hydrocarbons may be trapped.

Because of the complexity and size of the 3-D seismic data or datasets, various image-processing techniques have been developed, for example, to process the 3-D seismic data in order to provide a reasonable interpretation of the seismic data. Among the various techniques, one of the most notable is the horizon auto-picker. A horizon may be for example a change in lithology in the crust of earth or a chronostratigraphic boundary represented in a 3-D seismic volume by a characteristic trace shape over a certain time or depth interval. Horizons may be surfaces representing individual sedimentary layers of rock. A horizon map generated by a horizon auto-picker may provide petroleum exploration professionals, for example, with certain level of understanding of the geology and geometry of the subsurface of the earth. To date, a number of horizon auto-picker tools have been successfully developed and some are commercially available.

With the relative success in the horizon auto-picker tools, researchers have now moved to the relatively more difficult tasks of performing seismic fault geometry extraction or identification. Faults may include fracture surfaces in the subsurface rock caused by tectonic forces or other forces, or other displacements between underground formations or regions. Underground forces often lead to a near-vertical relative displacement between adjacent rock formations on both sides of the fracture. In seismic images, faults may be recognized by an abrupt vertical displacement of seismic sequences along some plane, which may be known as fault plane.

SUMMARY OF THE INVENTION

Embodiments of the invention may provide a system, which may be for example a computer system, and a method, which may be an automatic or semi-automatic method, for fault extraction and/or identification from a three-dimensional (3-D) volume of seismic data.

According to one embodiment of the invention, the system and method may define an initial active surface in the seismic data volume; identify one or more active surfaces by minimizing an energy function; track back the active surfaces to find a set of control points; and produce the fault patch position formed by the set of control points.

Embodiments of the invention may also provide a system and method for constructing a surface from a plurality of fault curves as the initial active surface.

According to one embodiment of the invention, constructing the surface may include applying interpolation to produce a set of control points from the plurality of fault curves.

Embodiments of the invention may also provide a system and method for extracting faultiness sections from the seismic data volume of a faultiness type to obtain faultiness values used in the minimizing of the energy function.

Embodiments of the invention may further provide a system and method for computing faultiness sections from the seismic data volume of a continuity type to obtain faultiness values used in the minimizing of the energy function.

Embodiments of the invention may also provide a system and method for estimating or computing a continuity attribute from the seismic data volume of a post-stack amplitude type; and computing faultiness sections from the continuity attribute to obtain faultiness values used in the minimizing of the energy function.

Embodiments of the invention may further provide a system and method for applying a combination of low-pass and high-pass filters to filter the seismic data of post-stack amplitude type.

Embodiments of the invention may provide a system for identifying a fault patch position from a seismic dataset. The system may include a seismic data volume; a fault identification module to receive a selection of multiple fault curves from the seismic data volume; and a processor adapted to execute the fault identification module to identify one or more active surfaces, to track back the active surfaces to find a set of control points, and to produce the fault patch position formed by the set of control points.

BRIEF DESCRIPTION OF THE DRAWINGS

The invention will be understood and appreciated more fully from the following detailed description of embodiments of the invention, taken in conjunction with the accompanying drawings of which.

It will be appreciated that for simplicity and clarity of illustration, elements shown in the figures have not necessarily been drawn to scale. For example, the dimensions of some of the elements may be exaggerated relative to other elements for clarity.

DETAILED EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

The methods and/or processes presented herein are not inherently related to any particular computer or other apparatus. Various general-purpose systems may be used with programs in accordance with the teachings herein, or it may prove convenient to construct a more specialized apparatus to perform the desired method. Embodiments of the present invention are not described with reference to any particular programming language. It will be appreciated that a variety of programming languages may be used to implement the teachings of the invention as described herein.

Unless specifically stated otherwise, as apparent from the discussions herein, it is appreciated that throughout the specification discussions utilizing terms such as "processing", "computing", "calculating", "determining", or the like, typically refer to the action and/or processes of a computer or computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Figure 1:
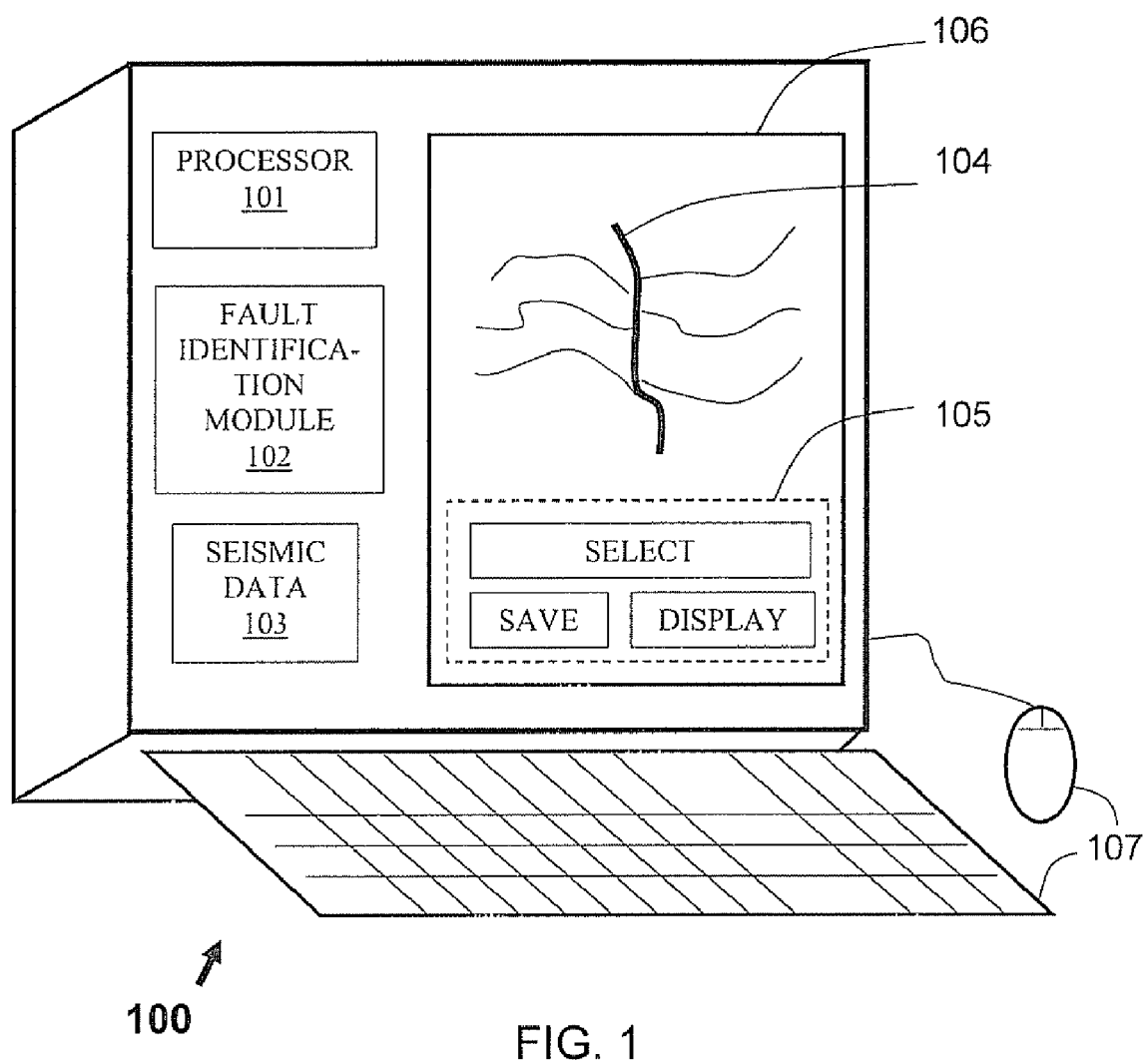
FIG. 1 depicts a computer system performing fault extraction from a seismic data set according to one embodiment of the invention.

FIG. 1 depicts a computer system able to perform fault identification from a seismic data set according to one embodiment of the invention.

As illustrated in FIG. 1, a computer system 100 may have a processor 101 and have access to and/or include software 102 such as a fault identification module executed by processor 101. Software 102 may be a computer program or program module able to for example perform fault extraction from a 3-D volume of seismic data 103 according to one embodiment of the invention, and may be able to provide visual presentation of the fault location 104 in a display environment 106.

Computer system 100 may also provide one or more user interfaces, in addition to interface 106 (display), for example interface 105 which may be, for example, a screen-touch graphic user-interface (GUI) and interface 107 which may be, for example, a mouse and/or a keyboard. User interfaces 105 and 107 may enable a petroleum exploration professional to, for example, select, define, and/or alter various data processing procedures to perform fault extraction. For example, a petroleum exploration professional may select one or more initial fault lineaments to start a fault extraction or identification process, for example, as described below in detail with reference to FIG. 3 and FIG. 4.

Figure 2A:
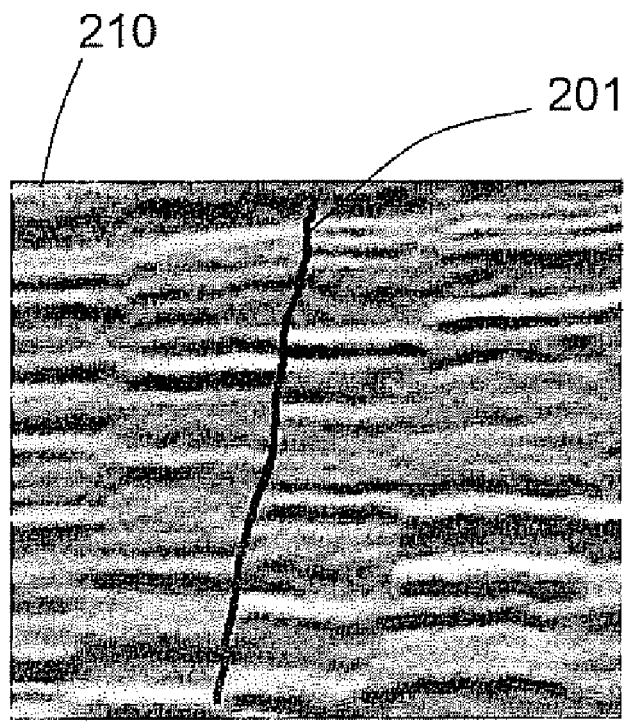
FIGS. 2A and 2B are graphical illustrations of a vertical slice of two-dimensional data through a three-dimensional seismic dataset according to one embodiment of the invention.
Figure 2B:
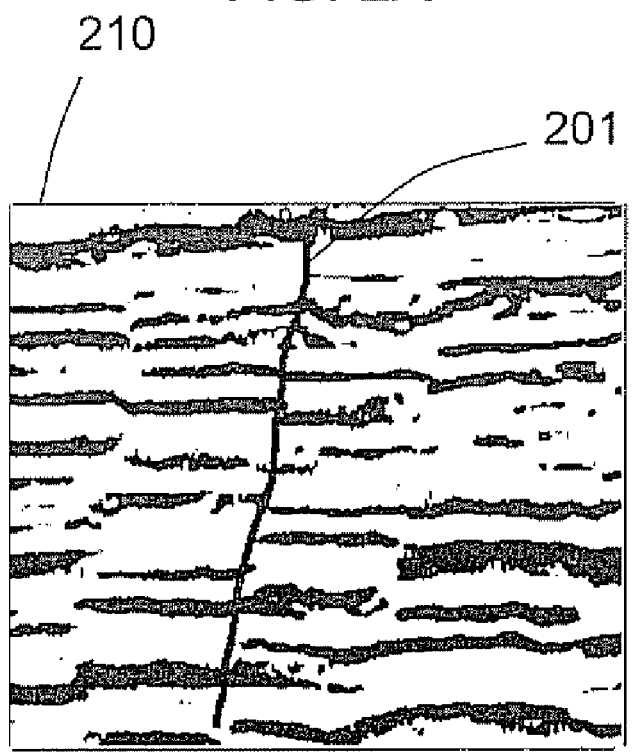

FIGS. 2A and 2B are graphical illustrations of a vertical slice of a two-dimensional (2-D) data through a 3-D seismic dataset according to one embodiment of the invention.

FIG. 2A shows a typical vertical 2-D slice through a 3-D seismic dataset. FIG. 2B is a simplified version of FIG. 2A. In both FIGS. 2A and 2B, the vertical direction shows depth below ground and the horizontal direction represents locations in parallel to the ground. The barcode-like patterns show sedimentary layers of the rocks with each black and white stripe representing one horizon. A geologically trained professional may appreciate that the patterns presented in this 2-D slice 210 of a 3-D seismic dataset, together with other parallel 2-D slices of the same 3-D seismic dataset, provide useful insight information into the rock formation and geological structure, as well as such things as the location and shape of geological structures in which hydrocarbons may be trapped.

A black line 201, which happens to substantially vertically stride through the black and white stripes as shown in FIG. 2B, may be generated for example by computer program or program module 102 (FIG. 1) based on the analysis of a seismic dataset from which 2-D slice 210 may be extracted. According to one embodiment of the present invention, black line 201 may be indicative of where a possible fault patch may exist, and therefore black line 201 may be referred to as a fault curve or fault lineament. A collection of multiple fault curves or fault lineaments being identified on a set of 2-D slices of a 3-D seismic dataset may form a possible position and/or location where a fault patch may exist or be present.

Figure 3:
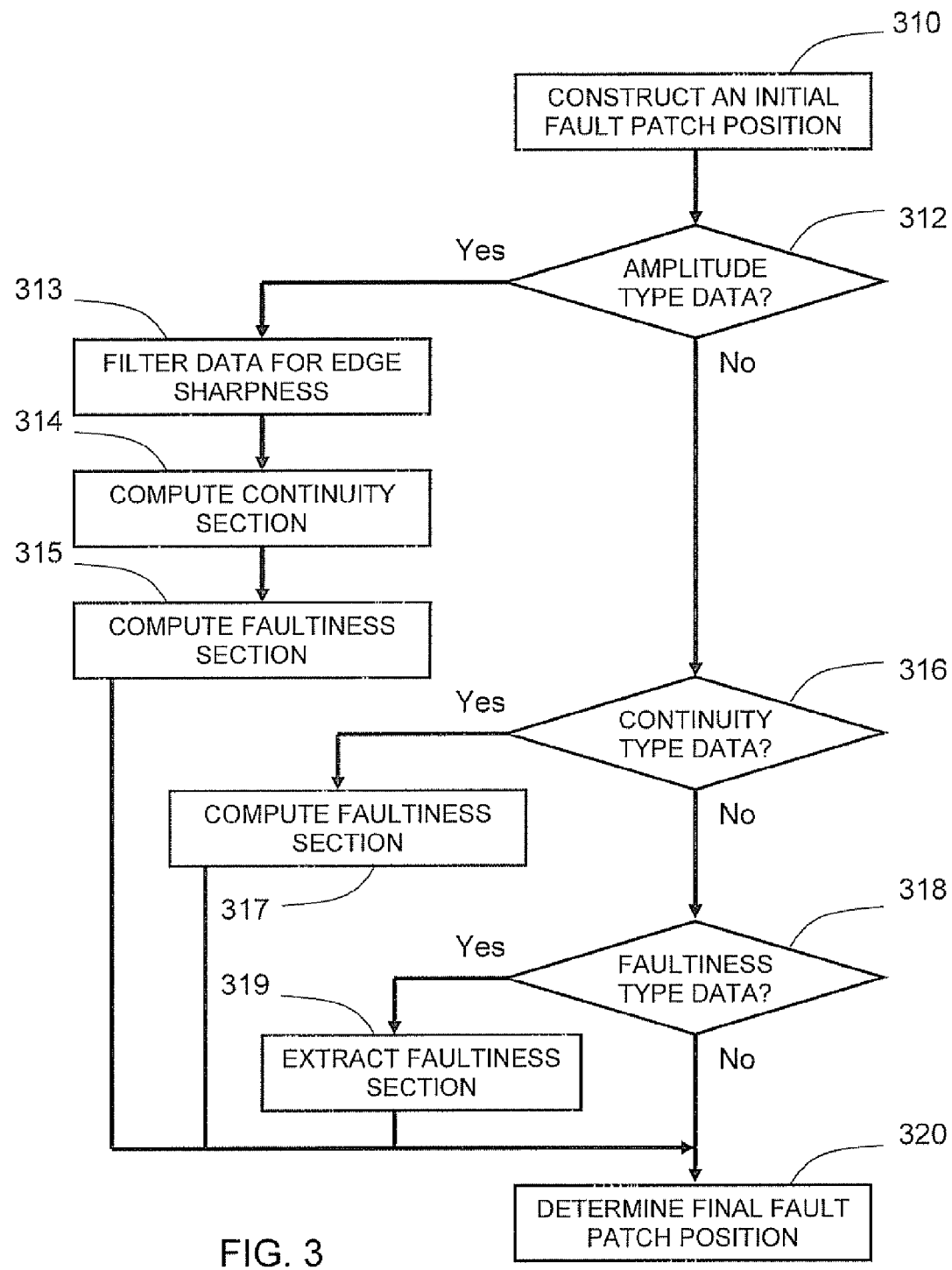
FIG. 3 is a flowchart illustration of a method for performing fault identification according to one embodiment of the invention.

FIG. 3 is a flowchart illustration of a method for fault patch identification according to one embodiment of the invention. An embodiment of the method may enable the identification or extraction of a geometry elementary fault plane, which may be a fault patch, from a 3-D seismic dataset. The elementary fault plane may be between two parallel seismic volumes along which fault curves or fault lineaments may have been identified by methods of the present invention, which may be described below according to one or more embodiments of the present invention.

The elementary fault plane or fault patch may be represented by a grid containing a plurality of vertices. A vertex of the fault plane may be a 3-D point. Numbers of lines and columns of the grid may be respectively numbers of fault curves and numbers of the 3-D points per fault curve. The elementary fault plane or surface may also be a collection of these fault curves or fault lineaments. The multiple fault curves identified or extracted, according to embodiments of the invention, may be further processed such as, for example, through merging, removing, and/or smoothing, to build or construct the fault plane or fault patch. According to one embodiment, one or more fault patches may be collected to form a fault surface.

Embodiments of a method according to one embodiment of the invention may be applied to different types of input seismic data or dataset such as, for example, post-stack amplitude data, continuity data, or faultiness data. However, the present invention is not limited in this respect and other types of data may be used. The post-stack amplitude data may be data obtained from processing, for example summation, of pre-stack amplitude data. The continuity data may be for example a set of coherency data generated by the CoreLab™ software, as is known in the art, which processes a set of post-stack amplitude data to produce the coherency data. According to one embodiment, the continuity data may also include data that is opposite to the discontinuity attribute computed from a post-stack amplitude volume by the Paradigm™ software The faultiness data may be, for example, an output "vector" fault volume generated by for example the Automatic Fault Extraction (ME) prototype from University of Colorado at Boulder.

As is illustrated in FIG. 3, one embodiment of the invention may build or construct an initial fault patch position at operation 310. The initial fault patch position may be made to be a surface between at least two fault lineaments selected by a user or a petroleum exploration professional, according to one embodiment of the invention. The selection or picking may be made manually, and/or may be picked automatically by for example computer software 102 according to some pre-defined algorithm. One embodiment of constructing an initial fault patch position is described in more detail below with reference to FIG. 4.

At operation 312, one embodiment of the invention may determine whether the input seismic data is a post-stack amplitude data. If it is a post-stack amplitude data, the data may be subjected to pre-processing such as filtering for image enhancement purpose as indicated at operation 313. Operation 313 of data pre-processing or filtering for edge sharpness may be optional and may be applied for example when the input seismic data, which is a post-stack amplitude data, is deemed noisy.

Various types of image enhancement approaches may be applied at operation 313. For example, an unsharp masking method may be one of the many approaches for performing image enhancement. The unsharp masking method may produce a high-pass filtered image and add the high-pass filtered image to the original image. As is known in the art, the unsharp masking method may be easy to use but is generally sensitive to noises existing in the image. Noise suppression may be performed with a low-pass filter, which in some cases may cause edge blurring. Therefore, according to one embodiment of the invention, a hybrid approach may be applied, which may include applying a combination of a nonlinear low-pass filter and a high-pass filter to pre-process the seismic dataset. The low-pass and high-pass filters may be made based on an adaptive filter mask, according to one embodiment, and may perform noise reduction as well as edge enhancement.

For example, a combination of local adaptive low-pass and high-pass filters may be described as follows. In general, a rectangular filter may be expressed, for example, as:

$$R_{KL} = \left\{ (i,j) \in \left[ -\frac{K-1}{2}, \frac{K-1}{2} \right] \times \left[ -\frac{L-1}{2}, \frac{L-1}{2} \right] \right\}$$

Other types of filters and other expressions may be used as well. The amplitude data may include a collection of image elements or picture elements or pixels. Each pixel may be located or identified or represented by their respective set of indexes, which may be integers denoted here as (i,j). In the above expression, $R_{KL}$ may represent a group of set of indexes (i,j) centered around an origin (0,0). The operation of filtering the amplitude data, in a section S for example, may include adjusting contribution of individual pixels inside section S according to their similarity with their currently existing pixels. The above filter may be further adjusted by various filter masks, one of which may be expressed for example as:

$$M = \{ m_{i,j} \in [0,1] | (i,j) \in R_{KL} \}$$

The above filter mask may provide weight coefficients, in the range of [0,1], to the combination of high-pass and low-pass filters as described above to adjust pixels (i,j) in the group $R_{KL}$. Each coefficient may be considered as a level of confidence (or similarity) for the pixel (x+i,y+j) which may be in the vicinity and belong to the same region as a current pixel (x,y).

Output from the filter may be expressed as for example:

$$g(x,y) = g_L(x,y) + \alpha g_H(x,y)$$

The low-pass component $g_L$ may be used to smooth data in homogeneous areas while the high-pass component $g_H$ is chosen as an edge detector in order to sharpen details in the image. The low-pass component $g_L$ and the high-pass component $g_H$ may be further expressed as follows.

$$g_L(x,y) = \sum_{(i,j) \in R_{KL}} h_{i,j} f(x+i, y+j) \text{ with } h_{i,j} = \frac{m_{i,j}}{\sum_{(k,l) \in R_{KL}} m_{k,l}}$$

$$g_H(x,y) = \sum_{(i,j) \in R_{KL}} w_{i,j} f(x+i, y+j) \text{ with } w_{i,j} = m_{i,j} - \overline{m}$$

$$\text{and } \overline{m} = \sum_{(k,l) \in S} m_{k,l} / |R_{KL}|$$

In the above expression, provided as examples, coefficient α may be used as a factor for adjusting the edge enhancement effect. If α is chosen low, the effect of smoothing is strong, otherwise if α is chosen high, the filter preserves better edges.

The filter mask may be selected as follows; other suitable methods may be used. In general, two pixels may be considered as being similar if they belong to the same horizon, which means that their corresponding seismic traces, which are amplitude samples collected along two directions corresponding to data acquisition for example along an inline and a cross-line directions, are highly correlated. A vector seismic trace may be defined as:

$$v_{trace}(x,y) = [f(x-k,y)]_{k \in [-N/2, N/2]},$$

wherein the trace size N is independent of L. Similarity of the two pixels may be locally estimated by using the correlation coefficient of the corresponding traces as for example below:

$$m_{i,j} = \frac{1}{2} + \frac{1}{2}\frac{v_{trace}(x, y) \cdot v_{trace}(x+i, y+j)}{\|v_{trace}(x, y)\|\|v_{trace}(x+i, y+j)\|}$$

The algorithm parameters may be for example:

K and L, the half sizes of the rectangular support

N, the window gate half-size for local similarity weight computation

α, the unsharp masking coefficient.

Other methods for estimating similarity between pixels may be used.

Following the optional image enhancement at operation 313, the post-stack amplitude data may be processed, at operation 314, for computation of continuity section to identify sections that are continuous horizons. The operation is described below with reference to FIG. 6 in detail. The continuity section obtained may then be further computed for identify or extract faultiness section at operation 315, which is described in detail below with reference to FIG. 7.

At operation 312, one embodiment of the invention may determine that the input seismic data is not a post-stack amplitude type of data. The embodiment may proceed to determine, at operation 316, whether the data is a continuity type of data. If the data is a continuity type of data, a faultiness section of the seismic dataset may be computed at operation 317. If the data is not a continuity type of data, it may be further determined, at operation 318, whether the data is a faultiness type of data. If the data is a faultiness type of data, the faultiness section may be extracted from the data at operation 319. According to one embodiment, the extraction may also include initial fault lineaments that may be picked or selected by the user, and one or more intermediary sections that are available.

From the faultiness section, which may be for example computed at operation 315 or 317 or extracted at operation 319 as described above, the initial fault patch or fault plane position assumed or constructed or picked by a user at operation 310 may be adjusted according to embodiments of the invention. The adjustment may lead to a refined or adjusted or final fault patch position at operation 320. One example of the adjustments according to one embodiment may be described in detail below with reference to FIGS. 8 and 9.

Figure 4:
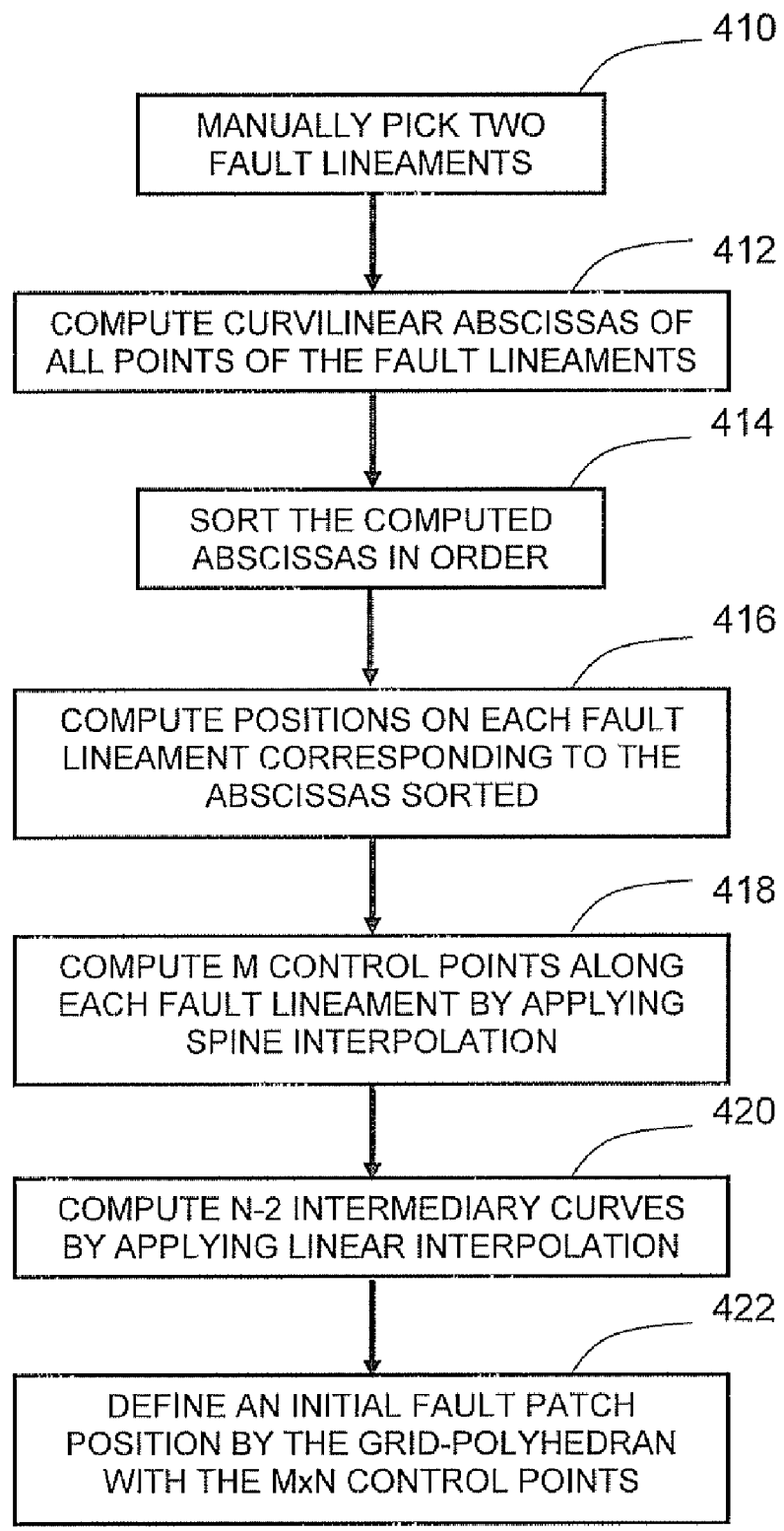
FIG. 4 is a flowchart illustration of a method for determining an initial fault patch position according to one embodiment of the invention.
Figure 5:
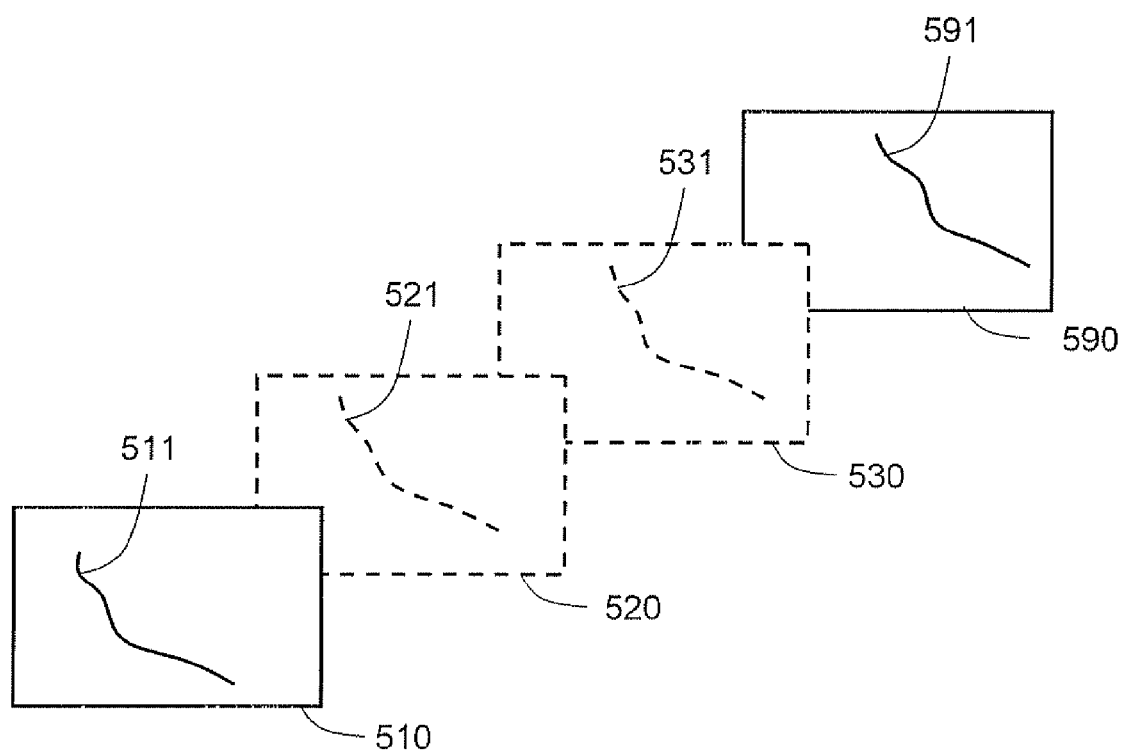
FIG. 5 is a graphical illustration of a method for determining an initial fault patch position according to one embodiment of the invention.

FIGS. 4 and 5 are flowchart illustration and graphical illustration of a method for constructing an initial fault patch position according to one embodiment of the invention.

As illustrated in FIG. 4, an embodiment of the invention may start with a user manually picking or selecting at least two fault lineaments at operation 410; other picking or selecting methods, such as automatic picking may be used. The two or more fault lineaments may be, for example, fault 511 in seismic data section 510 and fault 591 in seismic data section 590 as illustrated in FIG. 5. The two fault lineaments may have different numbers of data points and the data points may be at different positions having different abscissas. At operation 412, curvilinear abscissas of all the points of the fault lineaments may be computed, and the computed abscissas may be sorted at operation 414 according to one embodiment of the invention. The sorting may be made in ascending order or in descending order. However, other methods of sorting may be used. At operation 416, positions corresponding to the abscissas may be computed on each of the fault lineaments so that the fault lineaments may have the same data points of same abscissas. However, the invention is not limited in this respect and the fault lineaments may not need to have the same data points.

At operation 418, one or more additional control points between any two data points, which are generated at operation 416 and are also control points, may be obtained along each fault lineament. For example, a total of M control points may be computed by applying some mathematical process such as interpolation, for example, spine interpolation. However, other interpolation methods may be used as well.

At operation 420, one or more intermediary curves, representing intermediary fault lineaments or fault curves may be generated or computed by data interpolation, for example, linear interpolation as is known in the art. The obtained intermediary curves may be, for example, curve 521 of intermediary slice 520 and curve 531 of intermediary slice 530 of FIG. 5. Other number of intermediary curves of intermediary slices may be used. The two intermediary slices 520 and 530, and their respective curves 521 and 531, are shown in FIG. 5 for illustration purpose.

Figure 6:
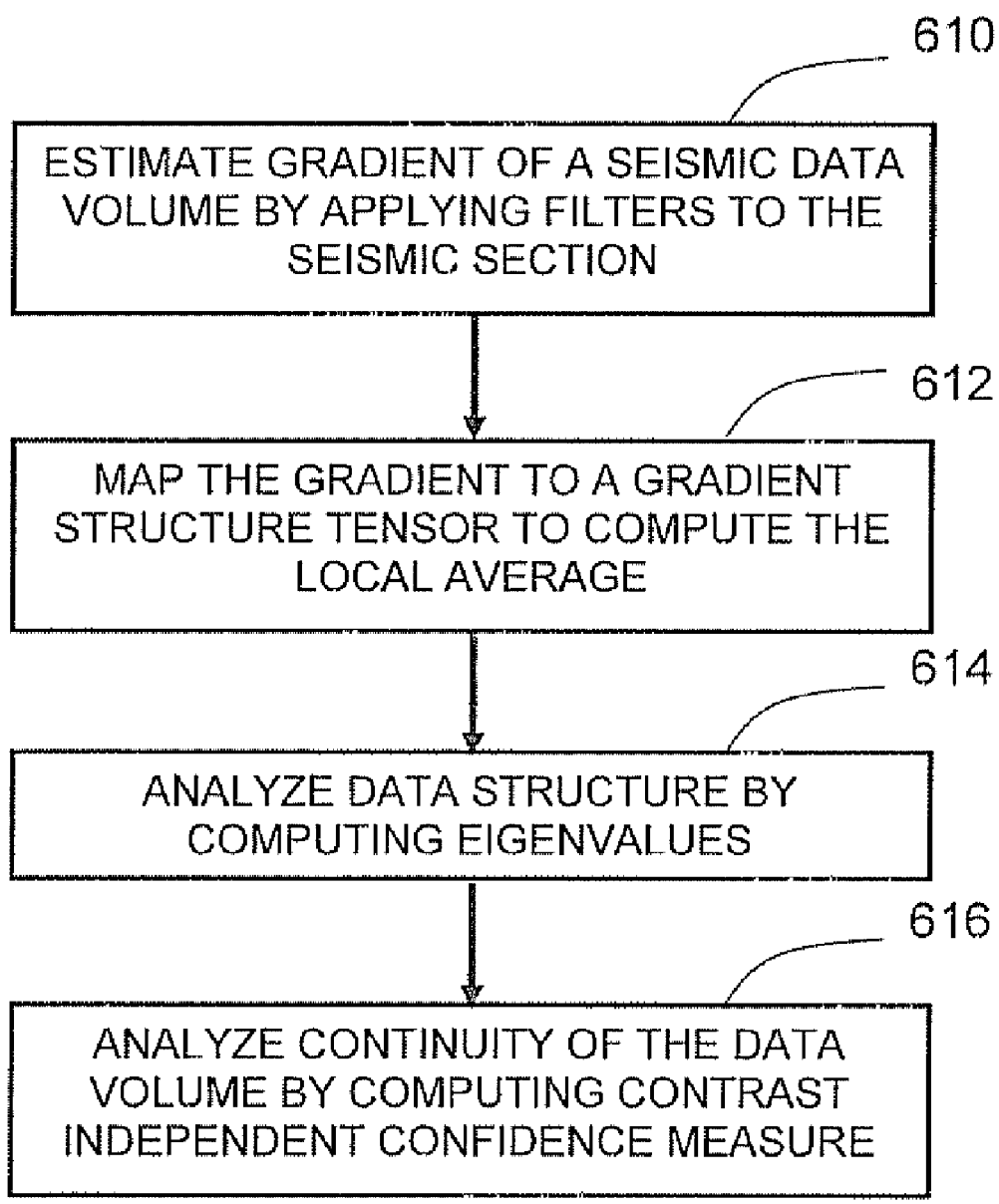
FIG. 6 is a flowchart illustration of a method for computing attributes related to the continuity of seismic data volume according to one embodiment of the invention.

FIG. 6 is a flowchart illustration of a method for computing attributes related to the continuity of seismic data volume according to one embodiment of the invention.

An embodiment of the invention may calculate attributes that measure the degree of continuity of horizons. For example, low values of some of the attributes may be indicative to locations or positions where horizons are discontinuous, e.g. potentially corresponding to presence of faults patches, planes, or surfaces. It is generally assumed that horizons are locally linear structures, and are characterized for example by the orientation of principal axes and the number of shift invariant orientations of the horizons. According to one embodiment, one such attribute characterizing the continuity of a seismic data volume may be derived from analyzing spectral properties of a gradient structure tensor (GST) being applied to a 2-D seismic section, as described below.

A gradient structure tensor may be defined as a two-by-two matrix T, and expressed, according to one embodiment of the invention, as below:

$$T = \overline{(gg^T)}$$

wherein $\overline{()}$ denotes weighted local average and g denotes a gradient vector of the seismic data. One method of computing the attribute relating to gradient structure tensor T, according to one embodiment of the invention, is described below in more detail.

At operation 610, the gradient vector g of a seismic data volume may be estimated. The estimation may include applying filters to filter seismic data volume. For example, a 2-D Sobel filter may be used in the filtering. Other types of filters and other estimation methods for the gradient vector g may be used.

At operation 612, the gradient vector g estimated at operation 610 may be mapped to a gradient structure tensor T. The mapping may include processes of, for example, applying the dyadic product and spatial averaging the tensor at a given scale. Other processes may also be used.

For example, local average of gradient or spatial integration may be computed by convolving the elements of the image or section/with a Gaussian kernel G. In the structure tensor spectral analysis, a unimodal orientation for horizons is generally assumed. The dominant orientation corresponds to the weighted average orientation. In the case of multiple maxima in orientation histogram, the dominant orientation will, in general, not match with a maximum.

The data structure may be further analyzed through the computation of eigenvalues of the gradient structure tensor. For example, if two eigenvalues, $\lambda_1$ and $\lambda_2$, are obtained, assuming $\lambda_1 > \lambda_2$ without losing the generality of following discussion, three cases of different types of local neighborhoods may be listed as in the following table; other types may be used.

TABLE 1

| $\lambda_1$ | $\lambda_2$ | Description |
|---|---|---|
| 0 | 0 | Both eigenvalues are zero. No gradient energy, no contrast. Constant intensity with no measurable structure. |
| >0 | 0 | One eigenvalue is zero. Linear Structure. |
| >0 | >0 | Both eigenvalues are greater than zero. The underlying structure deviates from the linear structure model, i.e. due to noise or curvature or multiple orientations. If $\lambda_1 = \lambda_2$, the structure is isotropic. |

When both eigenvalues are equal to zero, no gradient energy exists and therefore there is no contrast between neighboring pixels. In other words, pixel values are locally the same indicating a uniform region with substantially nothing visible. Intensities of the pixels are also locally constant across the seismic data volume with no measurable structure. When one eigenvalue is zero and the other one is larger than zero, it may be an indication that the seismic data volume has a linear structure. When both eigenvalues have positive values, the underlying structure of seismic data volume is deviated from a linear structure model due to, for example, noise or curvature or multiple orientations. Furthermore, if the two positive values are equal, the structure of data is isotropic.

At operation 616, the quality of continuity of the seismic data volume may be studied quantitatively by a corresponding confidence measure. The confidence measure, which may be contrast independent, may be derived from the values of the two eigenvalues as expressed below.

$$C = \frac{\lambda_1 - \lambda_2}{\lambda_1 + \lambda_2}$$

The confidence measure C, which is an attribute representing the continuity section of a seismic data volume, may values between zero and one and may indicate how the local data resembles a linear structure. The more isotropic a structure becomes (e.g., C→0) the more difficult it becomes to estimate the orientation of that structure. Therefore, the parameter C may be used as the confidence measure of the orientation estimation. Since a linear structure can also be viewed of as an anisotropic structure, C is also referred to as the anisotropy.

Figure 7:
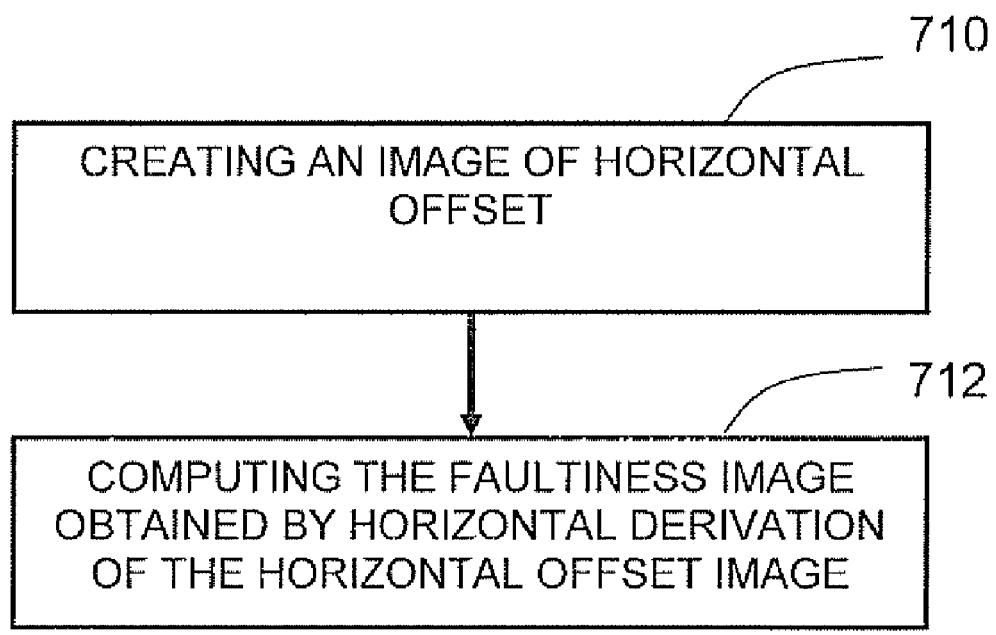
FIG. 7 is a flowchart illustration of a method for computing faultiness section according to one embodiment of the invention.
Figure 8A:
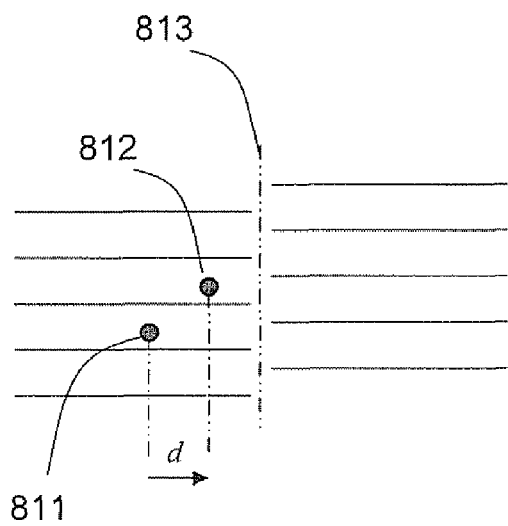
FIGS. 8A and 8B are graphical illustrations of a horizon offset relative to a fault position according to one embodiment of the invention.
Figure 8B:
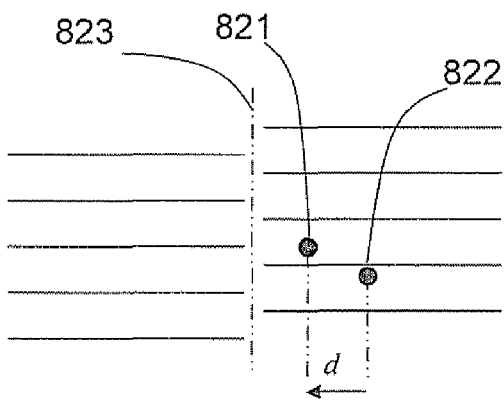

FIG. 7 is a flowchart illustration of a method for computing faultiness section according to one embodiment of the invention. FIGS. 8A and 8B are graphical illustrations of a horizon offset relative to a fault position according to one embodiment of the invention.

The continuity attribute described above may show locations where there is anisotropy or discontinuity of a seismic dataset. For example, it may show with more or less precision fault location, as well as other heterogeneous zones such as, for example, channels, chimneys, or diapir (salt dome). Embodiments of this method, for example as illustrated in FIG. 7, may be employed to extract from the continuity attribute C, as described above, zones that may be faults. The principle of this method may be based on the observation that the horizontal offset d between a current point, for example 811 in FIG. 8A, and the most anisotropic point belonging to a limited neighborhood, for example 812 in FIG. 8A, may be strongly positive near to the left of a fault, e.g., fault 813 in FIG. 8A. A similar observation may be that the horizontal offset d between a current point, e.g., 822 in FIG. 8B, and the most anisotropic point belonging to a limited neighborhood, e.g., 821 in FIG. 8B, may be strongly negative near to the right of a fault, e.g., fault 823 in FIG. 8B.

A fault may be considered as for example a virtual contour without real thickness within a vertical section or a constant time (or depth) slice. Therefore, its detection may be obtained by looking for points M(x, y) such that difference in horizontal offset d(x+1,y)−d(x−1,y), between pixels (x+1,y) and (x−1,y), is negative. However, this search may lead to erroneous detections, in particular in regions that are constituted of parallel horizons. These parallel horizons may include layered regions that are strongly coherent to produce random values of horizontal offset d. The embodiment of the method as shown in FIG. 7 and described below in detail, according to one embodiment of the invention, may produce robust results relating to the faultiness section.

The horizontal offset d, as illustrated in FIG. 8A and FIG. 8B, may be directly linked to the gradient structure tensor as described above. It may be equal to the opposite of the horizontal component $i_{max}$ which characterizes the adaptive support $R_{KL}$. As is described above for example, the rectangular centered support $R_{KL}$ may be assumed to be:

$$R_{KL} = \left\{ (i, j) \in \left[ -\frac{K-1}{2}, \frac{K-1}{2} \right] \times \left[ -\frac{L-1}{2}, \frac{L-1}{2} \right] \right\}$$

The $i_{max}$ at point M(x, y) may be defined by:

$$(i_{max}, j_{max}) = \arg\max\{C(x+i, y+j), (i,j) \in R_{KL}\}$$

At operation 710, an image of horizontal offset may be created. The image, noted as $O_H$ below, may be expressed in the following equation which is different from the horizontal offset image corresponding to the term d.

$$O_H(x,y) = i_{max}(x,y)(C(x+i_{max}(x,y), y+j_{max}(x,y)) - C(x,y))$$

In the above equation, the term $C(x+i_{max}(x, y), y+j_{max}(x, y))-C(x, y)$ may relate to a difference in homogeneity between a current point, e.g., 811 (FIG. 8A) and its most homogeneous neighboring point, e.g., 812 (FIG. 8A). The use of this term, that is, calculating the difference in homogeneity between a current point and its most homogeneous neighboring point may reduce the chance, or possibly avoid erroneous detections that may otherwise be caused. For example, in layered regions this term as a result of calculation may be null or almost null.

According to one embodiment of the present invention, at operation 712, a faultiness image, for example, image F, may be obtained through computation of horizontal derivation of the horizontal offset image $O_H$. Only values that correspond to a positive derivative of $i_{max}$ following the horizontal axis, characterizing a fault, may be retained. The value of F at point M(x,y) may be expressed as $$F(x, y) = \begin{cases} O_H(x+1, y) - O_H(x-1, y) & \text{if } i_{max}(x+1, y) > i_{max}(x-1, y) \\ 0 & \text{otherwise} \end{cases}$$

Figure 9:
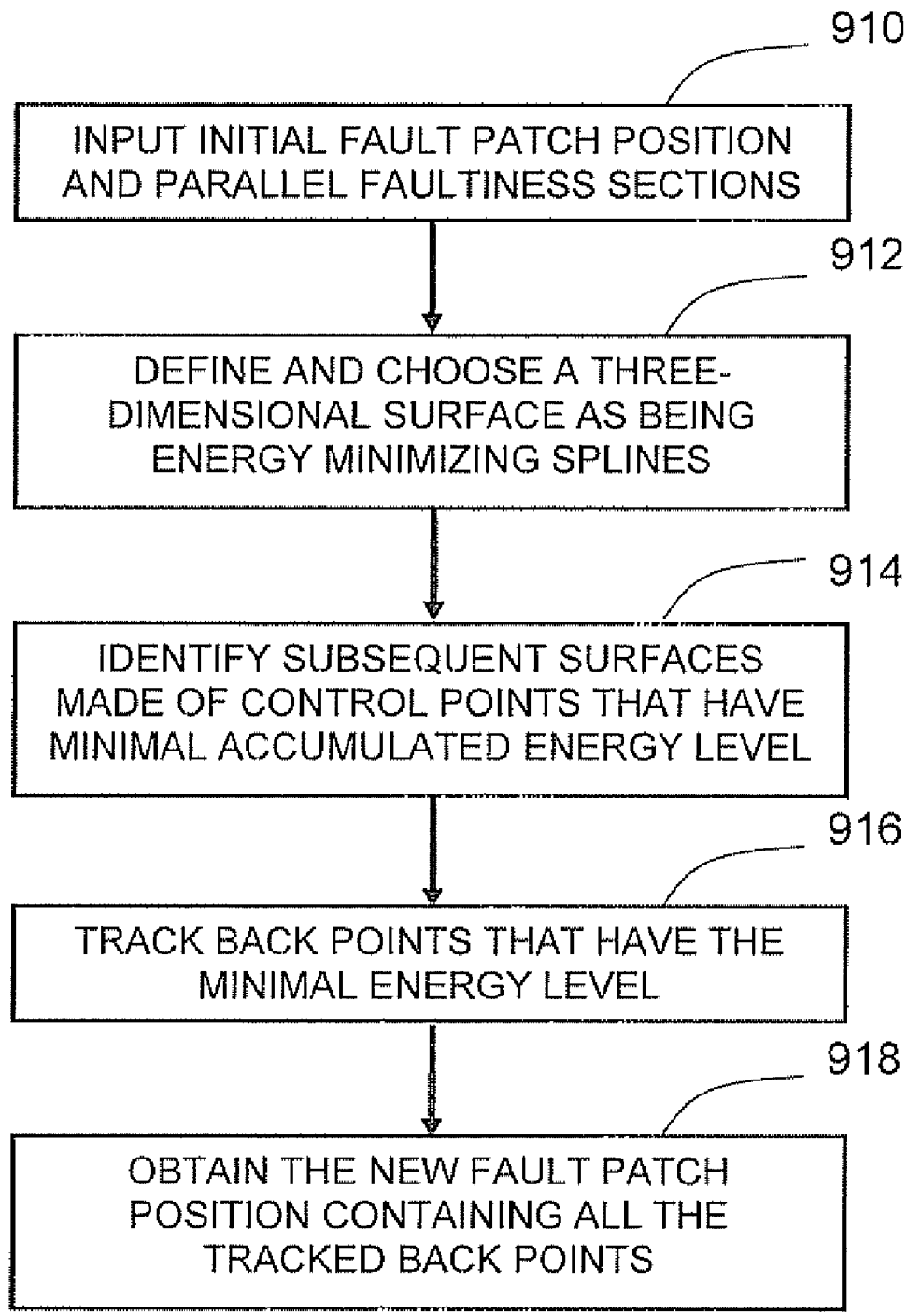
FIG. 9 is a flowchart illustration of a method for determining a fault patch position according to one embodiment of the invention.
Figure 10:
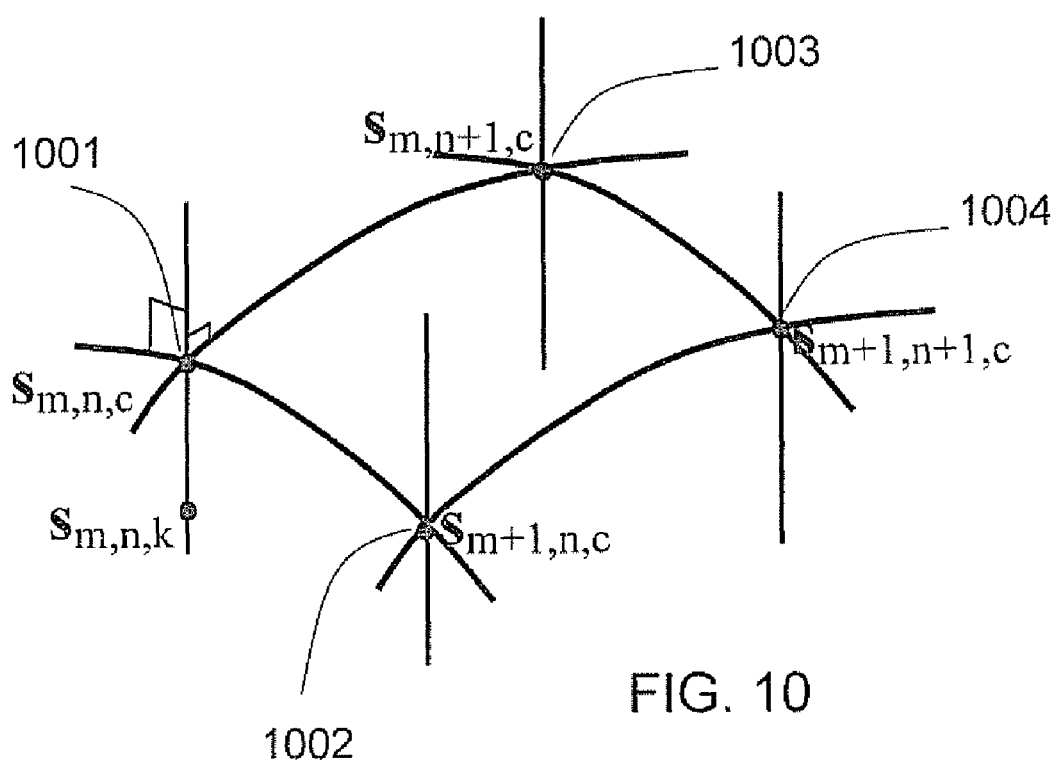
FIG. 10 is a graphical illustration of a method for determining a fault patch position according to one embodiment of the invention.

FIG. 9 is a flowchart illustration of a method for determining a fault patch or fault plane position according to one embodiment of the invention. FIG. 10 is a graphical illustration of the method for determining a fault patch position according to another embodiment of the invention.

After having defined the initial fault patch position, as described above with reference to FIG. 4, and identified the parallel faultiness sections, as described above with reference to FIG. 7, a refined or adjusted or final fault patch position may be determined as described below in detail with reference to FIGS. 9 and 10.

The embodiments of the method described in FIG. 9 and FIG. 10, may be based on the concept of a 3-D active surface (or snake surface), also known as energy minimizing splines, going through paths of minimal energy. With the iteration of certain operations of the method, energy fronts of the active surfaces (or snake surfaces) may be iteratively adjusted to obtain a local minimum. One embodiment of the invention may be described as using a controlled continuity spline under the influence of image forces or energy. An active contour on a seismic section may move under internal force constraints, associated with the local "curvature", and external force constraints which is the image forces or image energy. The internal spline forces may serve to impose a piecewise smoothness constraint. The image forces push the snake toward salient image features.

At operation 910, the method may take input information of an initial fault patch position and other parallel faultiness sections, and may define and choose, at operation 912, an active contour or surface represented by a continuous surface $s(u, v)=(x(u, v), y(u, v), z(u, v))$ with u and v being parameters. Surface $s(u, v)$ may be an active surface, and may be defined by for example a polyhedron having control points of $s_{m,n}$ m=0, ..., M-1; n=0, ..., N-1, as defined in the process of constructing the initial fault patch position (422 of FIG. 4). In FIG. 10, four of the control points, e.g., points 1001, 1002, 1003, and 1004, are shown for illustration purpose. The energy functional for the active surface (or snake surface, or snake front) may be defined by $$E_{snake} = \iint_{(u,v)\in[0,1]^2} E_{internal}(s(u,v)) + E_{external}(s(u,v)) \, du \, dv$$

wherein $E_{internal}$ represents the internal energy of the contour due to bending. $E_{internal}$ may also be known as the image potential (from it, images forces are obtained). The image forces can be due to various events. The internal energy may enforce the control points to follow the same direction and displacement. The internal energy, as used in snake surface energy calculation expressed above according to one embodiment of the invention, may be defines as for example:

$$E_{internal} = \alpha(|d_{m+1,n} - d_{m,n}| + |d_{m,n+1} - d_{m,n}|)$$

wherein $d_{m,n} = s_{m,n,k} - s_{m,n,c}$ and wherein $s_{m,n,k}$, $s_{m,n,c}$ are control points, denoting respectively, the current search candidate position and center position before movement. In the above equation, $\alpha$ is an energy ratio constant.

The control points $s_{m,n,k}(t)$ m=0, ..., M-1; n=0, ..., N-1; k=0, ..., P-1 of candidate positions may be uniformly sampled along a search line that is normal to the initial polyhedron. External energy may be defined by for example:

$$E_{external} = \beta F$$

where $\beta$ is an energy ratio constant and F is the corresponding faultiness value computed.

At operation 914, subsequent surfaces made of control points may be identified or computed that include control points having the minimal accumulated energy level. The energy of the active contour may be minimized by applying a dynamic programming algorithm as detailed below by a set of programming codes; other specific code sequences may be used, and other methods for minimizing energy may be used.

---

```
// Initialization
for p = 0, ..., P-1
  E(0,0, p) = 0
// Minimal accumulated energy for n = 0
for m = 1,..., M-1
  for p = 0, ..., P-1
```

$$E(m, 0, p) = \min_{k \in [0; P-1]} \{E(m-1, 0, k) + E_{internal}(s_{m,0,p}, s_{m,0,c}, s_{m-1,0,k}, s_{m-1,0,c}) + E_{external}(s_{m,0,k})\}$$

```
    B(m,0,p) = k^{min}
// Minimal accumulated energy for m = 0
for n = 1,..., N-1
  for p = 0, ..., P-1
```

$$E(0, n, p) = \min_{k \in [0; P-1]} \{E(0, n-1, k) + E_{internal}(s_{0,n,p}, s_{0,n,c}, s_{0,n-1,k}, s_{0,n-1,c}) + E_{external}(s_{0,n,k})\}$$

```
    B(0,n,p) = k^{min}
// Minimal accumulated energy for m = 1,...,M-1; n = 1,...,N-1
for m = 1,..., M-1
  for n = 1,..., N-1
    for p = 0, ..., P-1
```

$$E(m, n, p) = \min_{k \in [0; P-1]} \{E(m-1, n, k) + E(m, n-1, k) + E_{internal}(s_{m,n,p}, s_{m,n,c}, s_{m-1,n,k}, s_{m-1,n,c}, s_{m,n-1,k}, s_{m,n-1,c}) + E_{external}(s_{m,n,k})\}$$

```
      B(m,n,p) = k^{min}
```

---

In the above equations, $E(m,n,p)$ represents the accumulated minimal energy level and $B(m,n,p)$ are pointers that indicate minimum accumulation for each position p. P here is the number of positions scanned along segment normal to the surface and index k, $k \in [0; P-1]$, indicates minimum accumulation in each p.

After the control points have been processed, all the points that have the minimal energy levels are tracked back, as indicated at operation 916, through back pointer $B(m,n,p)$ in a reverse order, that is starting form position (M-1,N-1) to position (0,0). A new fault patch position is then obtained, at operation 918, containing all the tracked back points beginning with the candidate that has the minimal $E(M-1,N-1,p)$. That is, the points that are defined by:

$$s_{m,n} = s_{m,n,p^{min}}, \ m = 1, \ldots, M-1; \ n = 1, \ldots, N-1$$

where:

$$p^{min}(m, n) =$$

$$\begin{cases} B(m, n, p^{min}(m+1, n)) \text{ if} \\ E(m, n, B(m, n, p^{min}(m+1, n))) < E(m, n, B(m, n, p^{min}(m, n+1))) \\ B(m, n, p^{min}(m, n+1)) \text{ otherwise} \end{cases}$$

$$p^{min}(M-1, N-1) = \arg\min_{k \in [0;P-1]} \{E(M-1, N-1, k)\}$$

$$p^{min}(M-1, n) = B(M-1, n, p^{min}(M-1, n+1)) \ n = 0, \ldots, N-2$$

$$p^{min}(m, N-1) = B(m, N-1, p^{min}(m+1, N-1)) \ m = 0, \ldots, M-2$$

It will be appreciated by persons skilled in the art that the present invention is not limited to what has been particularly shown and described hereinabove. Rather the scope of the present invention is defined only by the claims, which are presented in the claim section.

What is claimed is:

1. A method for identifying a fault patch from a three-dimensional seismic data volume representing underground earth structures, the method comprising:
   in a computing system:
   defining an initial active surface, the initial active surface including a plurality of control points each in an initial position in the seismic data volume;
   computing a plurality of accumulation energy functions for the plurality of control points, wherein each accumulation energy function measures the energy associated with the plurality of control points each positioned in one of a plurality of different candidate positions associated with that control point, wherein computing comprises for the plurality of control points and for the plurality of candidate positions associated with each control point, measuring the accumulation energy functions of the combinations of each of the plurality of control points in each of the candidate positions associated therewith and each of the other of the plurality of control points in each of the candidate positions associated therewith; and
   producing the fault patch formed by the plurality of control points in the associated candidate positions for which a minimum accumulated energy is measured.

2. The method of claim 1, wherein each candidate position defines a different displacement of a control point in a direction that is normal to initial active surface.

3. The method of claim 1, wherein each accumulated energy function includes a measure of an internal energy of the active surface calculated based on distances between the plurality of control points in the surface.

4. The method of claim 1, wherein a plurality of control points forming the fault patch are obtained by, starting from one combination of candidate positions, tracking back through a plurality of other combinations of candidate positions and forming the fault patch using the control points in the combination of candidate positions for which a minimum accumulated energy is measured.

5. The method of claim 1, wherein the accumulated energy function is measured as a function of the local curvature of the active surface.

6. The method of claim 1, wherein the initial surface is constructed by interpolating a plurality of fault lineaments to produce a set of control points that form the initial surface.

7. The method of claim 1, comprising:
   extracting faultiness sections from the seismic data volume of a faultiness type to obtain faultiness values; and
   using the faultiness values to minimize the accumulation energy function.

8. The method of claim 1, further comprising:
   computing faultiness sections from the seismic data volume of a continuity type to obtain faultiness values; and
   using the faultiness values to minimize the accumulation energy function.

9. The method of claim 1, further comprising:
   computing a continuity attribute from the seismic data volume of a post-stack amplitude type;
   computing faultiness sections from the continuity attribute computed to obtain faultiness values; and
   using the faultiness values to minimize the accumulation energy function.

10. The method of claim 1, further comprising:
    applying a combination of low-pass and high-pass filters to filter seismic data from the seismic data volume of post-stack amplitude type.

11. A system for identifying a fault patch from a three-dimensional seismic data volume representing underground earth structures, the system comprising:
    a seismic data volume;
    a processor configured to define an initial active surface, the initial active surface including a plurality of control points each in an initial position in the seismic data volume,
    to compute a plurality of accumulation energy functions for the plurality of control points, wherein each accumulation energy function measures the energy associated with the plurality of control points each positioned in one of a plurality of different candidate positions associated with that control point, wherein when the processor computes, the processor is configured to, for the plurality of control points and for the plurality of candidate positions associated with each control point, measure the accumulation energy functions of the combinations of each of the plurality of control points in each of the candidate positions associated therewith and each of the other of the plurality of control points in each of the candidate positions associated therewith, and
    to produce the fault patch formed by the plurality of control points in the associated candidate positions for which a minimum accumulated energy is measured.

12. The system of claim 11, wherein each candidate position defines a different displacement of a control point in a direction that is normal to initial active surface.

13. The system of claim 11, wherein each accumulated energy function includes a measure of an internal energy of the active surface calculated based on distances between the plurality of control points in the surface.

14. The system of claim 11, wherein the processor is configured to obtain a plurality of control points forming the fault patch by, starting from one combination of candidate positions, track back through a plurality of other combinations of candidate positions and form the fault patch using the control points in the combination of candidate positions for which a minimum accumulated energy is measured.

15. The system of claim 11, wherein the processor is configured to measure the accumulated energy function as a function of the local curvature of the active surface.

16. The system of claim 11, wherein the processor is configured to construct the initial surface by interpolating a plurality of fault lineaments to produce a set of control points that form the initial surface.

17. The system of claim 11, wherein the processor is configured to extract faultiness sections from the seismic data volume of a faultiness type to obtain faultiness values used to minimize the accumulation energy function.

18. The system of claim 11, wherein the processor is configured to compute faultiness sections from the seismic data volume of a continuity type to obtain faultiness values used to minimize the accumulation energy function.

19. The system of claim 11, wherein the processor is configured to compute a continuity attribute from the seismic data volume of a post-stack amplitude type and compute faultiness sections from the continuity attribute computed to obtain faultiness values used to minimize the accumulation energy function.

20. The system of claim 11, further comprising a display to display the produced fault patch.

* * * * *